F. SAMUELSON.
HEAT ACCUMULATOR FOR LOW PRESSURE FLUID.
APPLICATION FILED DEC. 14, 1908.
1,021,216.
Patented Mar. 26, 1912.
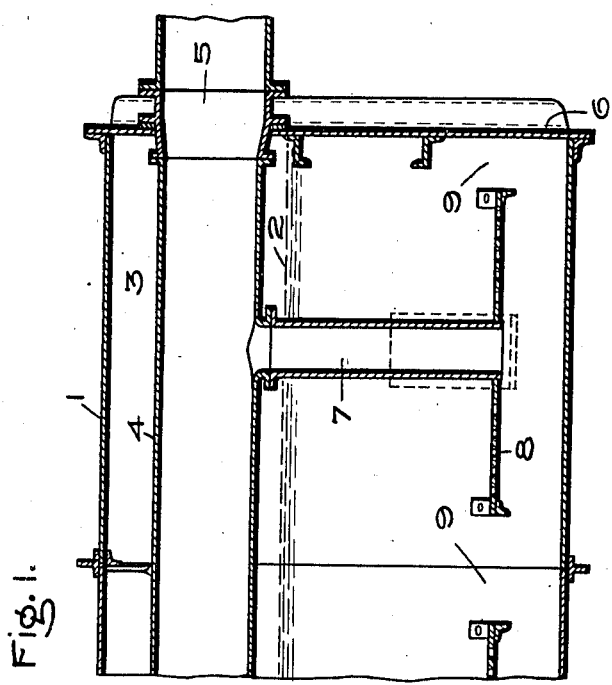
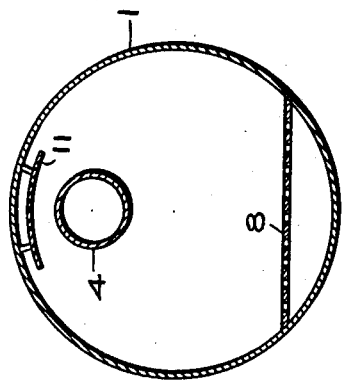
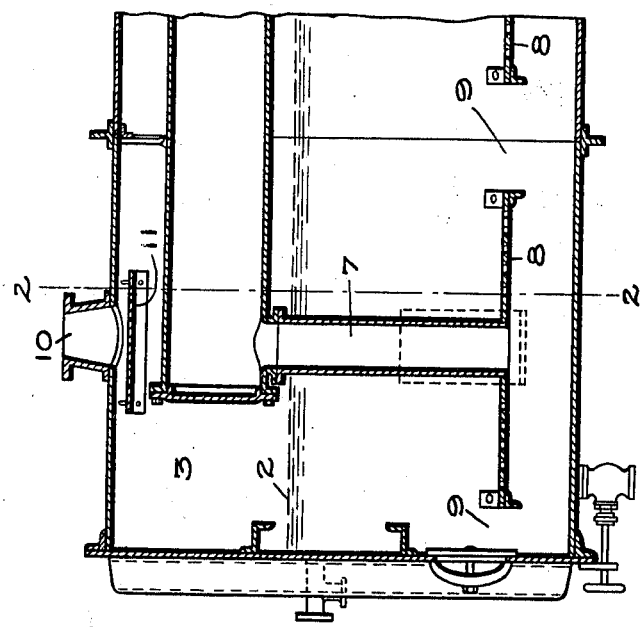
Witnesses:
Inventor,
Frederick Samuelson,
by Albert G. Davis
Att'y.

UNITED STATES PATENT OFFICE.

FREDERICK SAMUELSON, OF RUGBY, ENGLAND, ASSIGNOR TO GENERAL ELECTRIC COMPANY, A CORPORATION OF NEW YORK.

HEAT-ACCUMULATOR FOR LOW-PRESSURE FLUID.

1,021,216.   Specification of Letters Patent.   Patented Mar. 26, 1912.

Application filed December 14, 1908. Serial No. 467,508.

*To all whom it may concern:*

Be it known that I, FREDERICK SAMUELSON, a subject of the King of Sweden, residing at Rugby, England, have invented certain new and useful Improvements in Heat-Accumulators for Low-Pressure Fluids, of which the following is a specification.

The present invention relates to heat accumulators of the type proposed for use in connection with prime movers to furnish a secondary supply of low-pressure fluid for driving a low-pressure engine or turbine, or for other purposes, the heat stored in the accumulators being obtained from the exhaust of a primary engine.

The accumulator is more particularly suitable for use with intermittently loaded non-condensing engines so as to enable the exhaust from such an engine to be utilized in a low-pressure turbine for driving electrical apparatus for lighting or power purposes, or both, thereby obtaining more economical working of the steam than was hitherto possible.

More specifically, my invention comprises improvements in the construction of heat accumulators in which the exhaust fluid, usually steam, is passed through water in a suitable receptacle so as give its heat thereto and generate low-pressure steam.

In carrying out my invention the exhaust steam from the engine or other source is delivered to one or more conduits arranged in the steam space of the accumulator from which conduit or conduits the exhaust steam is directed vertically downward through suitable conduits into the body of water between which and said steam heat is to be interchanged, the steam and water which rise from the lower ends of the vertical conduits passing through perforated plates or the like whereby a thorough mixing of the steam and water is obtained and an effective interchange of heat results.

In the accompanying drawing illustrating one of the embodiments of my invention. Figure 1 is a vertical longitudinal section of a heat accumulator constructed according to my invention with parts thereof broken away; and Fig. 2 is a transverse section of the accumulator on the line 2—2 of Fig. 1, said figure being drawn to a smaller scale.

In the embodiment of my invention shown in the drawing, I provide a cylindrical shell or casing 1 which is approximately one-half filled with water, the normal water level being indicated at 2. In the steam space 3 of this accumulator is arranged a longitudinal conduit 4 which is closed or cut off at its ends from the steam space. The exhaust steam inlet may connect with this conduit through any portion of the upper part of the accumulator. In the example illustrated, the exhaust steam from the primary engine or other source is admitted to one end of the conduit 4 through an inlet 5 located in the head 6 of the shell or casing. At suitable intervals along the length of this conduit are connected downwardly-extending vertical pipes or conduits 7 which open at their lower ends into the body of water at a short distance above the bottom of the accumulator. At the lower extremity of each conduit 7 is fitted a perforated horizontal plate 8 extending across the accumulator from side to side. The plates 8 are separated from each other and from the heads of the casing so as to form openings 9 for allowing the water forced out by the steam discharge from the conduits 7 to escape upwardly and relieve the pressure underneath the horizontal plates and also to promote circulation of the heated water. The perforated plates also act to relieve said pressure by permitting an upward flow through their perforations and to divide up the stream and water into streams which rise upwardly from the bottom of the accumulator so that a thorough mixing takes place. Instead of the straight perforated baffle-plate construction above described I may supply the steam to the water from the conduits 7 through other equivalent means which will cause a thorough mixing of the exhaust steam and water.

In order to insure even distribution of the heating of the water along their length, the cross-section of the downwardly-extending pipes 7 may be varied to suit the decrease of pressure along the length of said pipes in a manner well understood. The steam generated in the accumulator may be taken off by suitable means such for example as an outlet pipe 10 which is provided at its inlet end with a perforated baffle-plate 11 to separate water from the steam supply to the secondary engine or turbine. The accumulator may be provided with the usual gage glasses and other accessories, and also with suitable means to maintain a constant water level and prevent excess pressure.

My invention has been described in connection with apparatus using steam, but it is also applicable to apparatus using other condensable vapors.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. A heat accumulator for supplying low-pressure motive fluid comprising a casing having a conduit located within it which receives the vapor supplied to the accumulator from some suitable source, a second conduit delivering vapor from the first conduit into a body of liquid in the casing, means adjacent the outlet of the second conduit for mixing the vapor and liquid and for preventing said vapor from rising directly to secure an effective interchange of energy between them, and means for conveying motive fluid from the casing.

2. A heat accumulator for supplying low-pressure motive fluid comprising a casing having a conduit arranged in the vapor space thereof and receiving the vapor which is supplied to the accumulator from some suitable source, a plurality of conduits leading downward from the first conduit to deliver said vapor into a body of liquid in the casing, means adjacent the lower ends of the second conduits for mixing the vapor and liquid and for preventing said vapor from rising directly to secure an effective interchange of heat between them, and means for conveying motive fluid from the casing.

3. A heat accumulator for supplying low-pressure motive fluid comprising a cylindrical casing having a horizontal conduit arranged in the vapor space thereof and receiving the vapor supplied to the accumulator from some suitable source, a plurality of vertical conduits leading downward from the horizontal conduit to deliver said vapor into a body of liquid in the casing, perforate means adjacent the lower ends of said vertical conduits for mixing the vapor and the liquid and for preventing said vapor from rising directly to facilitate the interchange of heat between them, and means for conveying motive fluid from the casing.

4. A heat accumulator for supplying low-pressure fluid comprising a casing having a horizontal conduit situated in the vapor space in the upper portion thereof and receiving vapor from a suitable source, such as the exhaust of a prime mover, a plurality of vertical conduits spaced apart and leading downward from the horizontal conduit which deliver all the vapor from it into a body of liquid contained in the casing, perforated plates surrounding the outlets of said vertical conduits which cause the vapor to spread laterally and mix with the liquid, thereby facilitating the interchange of heat, and means for conveying motive fluid from the vapor space of the casing.

5. A heat accumulator for supplying low-pressure fluid comprising a casing containing water and steam spaces and having a horizontal conduit arranged in the steam space in the upper portion of the casing and receiving steam from a suitable source, such as the exhaust of a prime mover, said conduit being closed to the steam space, a plurality of horizontal perforated plates extending across the lower portion of the water space of the casing which spread the vapor laterally before it can rise, there being spaces between adjacent transverse edges of the plates to provide openings for circulation, vertical conduits leading downward from the horizontal conduit which deliver all the steam from said conduit through the center of said plates to the region below, and means communicating with the steam space for conveying motive fluid from the casing.

In witness whereof, I have hereunto set my hand this 1st day of December, 1908.

FREDERICK SAMUELSON.

Witnesses:
 CHARLES H. FULLER,
 A. FOSTER.